US012434393B2

(12) United States Patent
Dalgaard

(10) Patent No.: US 12,434,393 B2
(45) Date of Patent: Oct. 7, 2025

(54) GRIPPER AND A METHOD OF USING A ROBOT WITH THE GRIPPER

(71) Applicant: MAREL A/S, Arhus (DK)

(72) Inventor: Jens Kongensholm Dalgaard, Arhus (DK)

(73) Assignee: MAREL A/S, Arhus N (DK)

( * ) Notice: Subject to any disclaimer, the term of this patent is extended or adjusted under 35 U.S.C. 154(b) by 0 days.

(21) Appl. No.: 18/564,690

(22) PCT Filed: Jun. 3, 2022

(86) PCT No.: PCT/EP2022/065240
§ 371 (c)(1),
(2) Date: Nov. 28, 2023

(87) PCT Pub. No.: WO2022/254030
PCT Pub. Date: Dec. 8, 2022

(65) Prior Publication Data
US 2024/0253247 A1 Aug. 1, 2024

(30) Foreign Application Priority Data
Jun. 4, 2021 (EP) .................................... 21177791

(51) Int. Cl.
B25J 15/02 (2006.01)
B25J 11/00 (2006.01)

(52) U.S. Cl.
CPC ....... B25J 15/0253 (2013.01); B25J 11/0045 (2013.01)

(58) Field of Classification Search
CPC .............. B25J 15/0273; B25J 15/0266; B25J 11/0045; B25J 15/0014; B25J 15/0253; B25J 15/0052; Y10S 901/31; Y10S 901/39; B65G 47/90
USPC ........ 294/207, 119.1, 67, 81.54; 901/31, 39; 414/789.8, 790.2, 792.9, 796.9, 941
See application file for complete search history.

(56) References Cited

U.S. PATENT DOCUMENTS 9,573,279 B2 * 2/2017 Kobori .................. B25J 9/0009
2010/0225132 A1 9/2010 Weber
2012/0086226 A1 4/2012 Weber
(Continued)

FOREIGN PATENT DOCUMENTS

DE 102010028410 A1 11/2011
DE 102015113220 A1 2/2017
(Continued)

OTHER PUBLICATIONS

Extended European Search Report from corresponding EP Application No. 21177791.7, Dec. 10, 2021.
(Continued)

Primary Examiner — Gregory W Adams
(74) Attorney, Agent, or Firm — Workman Nydegger

(57) ABSTRACT

A gripper for gripping an item, particularly a plate shaped item, includes a base, and a first jaw member and a second jaw member movable to grip the item. To ensure release of the item from the jaw members and thereby precise delivery of the item, the gripper comprises a guard structure forming contact surfaces located such that inner surfaces of the other jaw member moves between positions on opposite sides of the contact surface when the item is gripped and released.

20 Claims, 10 Drawing Sheets

(56) References Cited

U.S. PATENT DOCUMENTS

2012/0161459 A1* 6/2012 Weber ................. B25J 15/0266
  294/86.4
2013/0134726 A1 5/2013 Waizenegger

FOREIGN PATENT DOCUMENTS

| | | | |
|---|---|---|---|
| DE | 102019107042 A1 | 9/2019 | |
| EP | 0594476 A1 * | 4/1994 | ............ B65G 61/00 |
| EP | 2383211 A1 | 11/2011 | |
| EP | 2508452 A1 * | 10/2012 | ............ B65G 47/90 |
| GB | 2589185 A | 5/2021 | |
| JP | S59190116 A | 10/1984 | |
| JP | S61263524 A | 11/1986 | |
| JP | 2002103268 A | 4/2002 | |
| WO | 2007093774 A1 | 8/2007 | |
| WO | 2016177540 A1 | 11/2016 | |
| WO | 2018122323 A1 | 7/2018 | |

OTHER PUBLICATIONS

International Search Report from corresponding PCT Application No. PCT/EP2022/065240, Aug. 31, 2022.

* cited by examiner

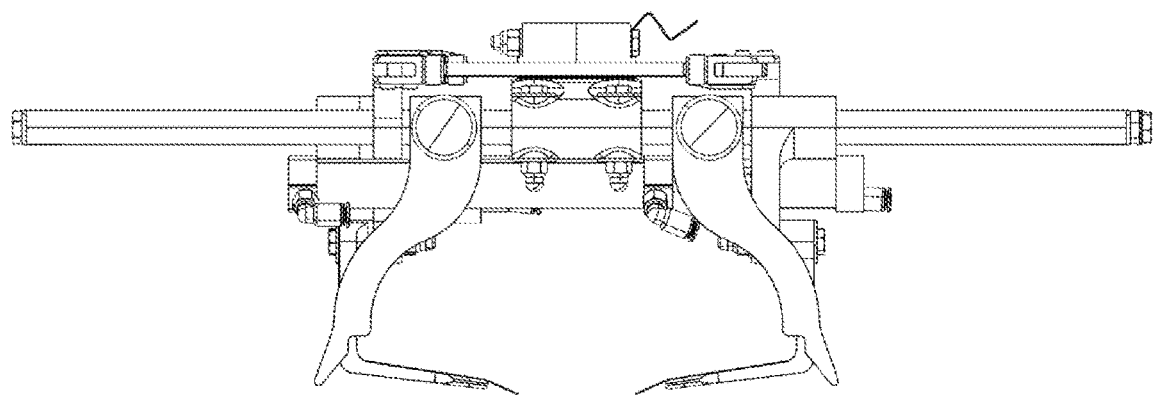
Fig. 5
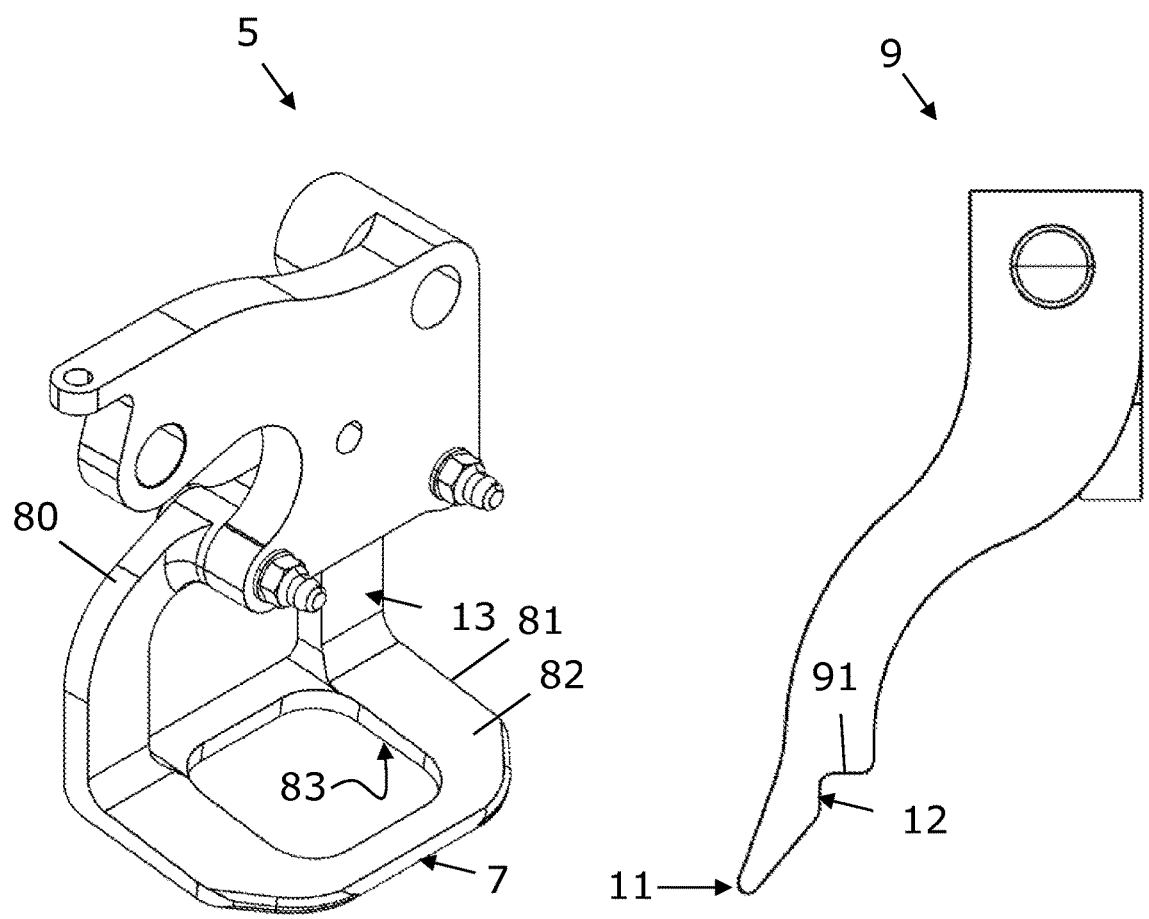
Fig. 6
Fig. 7

GRIPPER AND A METHOD OF USING A ROBOT WITH THE GRIPPER

INTRODUCTION

The present disclosure relates to a gripper for gripping items and a method for picking up and re-positioning an item carried by a support surface. Particularly, the disclosure is concerned with picking up plate shaped elements, e.g. plates carrying food.

More specifically, the disclosure relates to a gripper comprising:
a base,
a first jaw member and a second jaw member.

Each jaw member defines a forward edge extending towards the forward edge of the other jaw member and at least one jaw member is movable relative to the other jaw member to define an open jaw position and a closed jaw position.

The forward edges are closer to each other in the closed jaw position than in the open jaw position such that the jaw members can cooperate to grip the item.

BACKGROUND

Grippers of the above stated kind are used inter alia in food processing industries for handling food products such as meat.

WO2007093774 discloses a pick and place device for picking up and re-positioning an article carried by a support surface.

Although this pick and place device shows significant advantages over prior art grippers it may be desired to facilitate precise delivery of the items, and particularly to allow precise arrangement of items in a specific location. The disclosed device may not be optimal for handling thin, plate shaped elements such as cardboard plates carrying sliced food, e.g. slices of smoked salmon etc.

Particularly, it may be difficult, by use of existing pick and place devices to arrange plate shaped items precisely. Such plates may not only be difficult to catch from a plane surface, e.g. a surface of a conveyor belt. It may also be difficult to maintain in a fixed position in the gripper during acceleration and deceleration, and they may stick to the gripping device when release is intended. It may further be difficult to avoid cross-contamination between food items handled with the same gripper.

SUMMARY

On the above background it is an object of embodiments of the disclosure to provide an improved gripper, and particularly a gripper facilitating more precise delivery of the items. It is a further object to facilitate a higher throughput by enabling faster movement of a robot handling the gripper, and to protect items being handled by the gripper, particularly relative to cross-contamination.

According to these and other objects, a gripper is provided in a first aspect. The gripper comprises a base, a first jaw member, and a second jaw member.

The jaw members define a forward edge towards the forward edge of the other jaw member, and at least one of the jaw members is movable relative to the other jaw member to define an open jaw position and a closed jaw position.

The forward edges are closer to each other in the closed jaw position than in the open jaw position such that the item can be gripped between the jaw members.

To ensure precise release of the item from the jaw members when the jaw members move back to the open jaw position and thus releases the grip, the gripper comprises a guard structure comprising a first guard and a second guard extending in an upright direction between a free end and the base. Each guard forms a contact surface facing a contact surface of the other guard.

In use, the gripper is particularly for gripping items on a horizontal support surface. By definition herein, the gripper is attachable to a robot at a robot interface. In use, this interface is typically vertically above the forward edges of the jaw members. For defining elements of the gripper, a vertical centre-plane is introduced extending from the robot interface through a point centrally between the forward edges of the jaw members.

The upright direction is herein defined as any direction having a vertical component in this plane, i.e. not necessarily a vertical direction but a direction which can be projected onto the vertical centre-plane and defines a component therein.

The jaw members are arranged, in response to movement to the closed jaw position, to lift the item in the upright direction to a position located between the contact surfaces of the guards. Accordingly, the item can be lifted from a position where it is not between the contact surfaces into a position where it is between the contact surfaces. Particularly, this feature may be useful for handling thin or flat items such as cardboard plates, e.g. for handling slices of food such as salmon slices.

When the item is between the contact surfaces of the guards, the guards can prevent lateral sliding of the item out of the gripper, and they may prevent lateral sliding of the item when the jaw members move to the open jaw position. When the jaw members move to the open jaw position, the item stays between the contact surface, until the jaw members reach a position, where the item is free to fall vertically from the location between the contact surfaces. Accordingly, the item can be delivered precisely to a fixed location determined by the contact surfaces.

Since lateral sliding of the item is prevented by sideways contact between the gripper and the items, cross-contamination between subsequently gripped items can be prevented. This effect is particularly relevant when gripping plates carrying food items, e.g. cardboard plates carrying fish, poultry, or meat. In such cases, the edges of the cardboard plates may contact the contact surface without the food item being touched by the gripper.

Particularly, the contact surfaces may have a location which is fixed relative to the base or which is adjustable, however fixed relative to the base during a procedure where an item is gripped, moved, and released from the gripper.

The gripper may particularly be configured for food processing. It may e.g. be made from material accepted for food processing, examples of which include anti corrosive steel materials and polymer materials such as POM, PA, PETG, PEHD, or Teflon etc. The gripper may particularly be configured for operation in combination with a robot. The gripper may operate for picking up and re-positioning items. Particularly, the gripper may be used to reposition blanks of a plate shaped material, e.g. cardboard carrying e.g. fish such as salmon etc.

The gripper may grip the item from a support surface, e.g. a surface of a conveyor belt, and the gripper may be used to grip the items while they are moved by the support surface.

The base may form an interface towards a robot such that the gripper can be moved according to a programmed path e.g. based on vision systems detecting the location of the item to be gripped. The interface may e.g. form a releasable fixation to the robot, e.g. a fixation which can be controlled by pressurized air or other forms of actuators allowing the robot to exchange gripper.

The base may further hold components for controlling the gripper, e.g. pneumatic valves, and cylinders for actuating the opening and closing of the jaw members or electric actuators for that purpose. The base may further hold various sensors for sensing the position of the jaw members, pinching structures or for other purposes. It may further comprise camera means for capturing image(s) of the item being gripped and of a location such as a plate or box where the item is to be positioned into. Additionally, the base may comprise fixation and bearings for holding the jaw members and the guards.

The first jaw member and the second jaw member may define a shaft portion and a foot portion, e.g. as two distinct elements which are joined, or which are formed in one piece.

The shaft portion and the foot portion may e.g. extend in different directions. The shaft portion may extend in an upright direction between the base and the foot portion, and the foot portion may extend laterally from the shaft portion in an inwards direction towards the foot portion of the other jaw member. The foot portion and the shaft portion may extend e.g. 30-120 degrees to each other, e.g. between 75 and 100 degrees to each other, e.g. perpendicular to each other.

Each jaw member defines an inner surface facing an inner surface of the other jaw member. When lifting an item, it may be squeezed between, or at least be in contact with these inner surfaces. To ensure swift and precise release of the item from the jaw members, the jaw members and guards may be arranged such that the inner surfaces are located on one side of the contact surface in the closed jaw position and on an opposite side of the contact surface in the open position. In one embodiment, the inner surface comprises a grip-enhancing surface texture with projections. In this embodiment, it is sufficient if an upper level of this texture, i.e. a point being closest the opposite jaw member, is moved to opposite sides of the contact surface in the open and closed positions of the jaw members.

Accordingly, when the jaw members move from the open jaw position to the closed jaw position, the inner surfaces move from a distal position where a distance between the inner surfaces exceeds a distance between the contact faces, to a proximal position where the distance between the contact faces exceeds the distance between the inner surfaces.

In the distal position, the inner surfaces are further away from the vertical centre-plane than the contact surfaces, and in the proximal position, the contact surfaces are further away from the vertical centre-plane than the inner surfaces.

Since the jaw members are movable to bring the inner surfaces reversely between opposite sides of the contact surface of the guards, the item may contact the contact surface of the guard during movement of the jaw members to the open position and the item will thus be released from the jaw members. At this point, the item is in a well-known position with one edge against the contact surface, and repeated delivery at the same location or precise predefined delivery positions can be obtained. In one example, the item could be a plate which is delivered in a pocket defined by a vacuum formed sheet. Since such pockets narrowly surrounds the cardboard, it is important that the delivery position is precise.

Herein, the jaw member being located on one side of the contact surface in the closed jaw position and on an opposite side of the contact surface in the open position means that the jaw members move across a plane which includes the contact surface and extending perpendicular to the direction of movement of the jaw members between open and closed jaw positions.

The foot portion may have an upper surface towards the base and an opposite lower surface facing away from the base. The upper surface may be inclined meaning that the surface raises from a vertically lower point at the forward edge to a vertically higher point where the foot interfaces the shaft. This may lift the item into the position between the contact surfaces of the guards when the jaw members move to the closed jaw position.

The upper and lower surfaces may terminate in the forward edge. The inner surface adapted for contact with the item when gripping the item, may be formed as a surface of the shaft portion.

The forward edge of the jaw members may be a part of the foot portion, and it may be relatively sharp, preferably with a thickness less than 1 cm. such as less than 2 mm. This facilitates the sliding of the foot portion under the item, i.e. between the support surface and the item. It may be formed by a material which is stronger or more wear resistant than the remaining part of the jaw member. In one embodiment, the entire jaw member(s) is formed in one piece from one material, e.g. a polymer material. The forward edge could be made from steel.

The open position of the gripper may be adjustable such that the gap between the inner surfaces in the open position of the jaw members can be adjusted depending on the size of the item which is gripped. The adjustment may be based e.g. on vision or other forms of sensor feedback identifying a size of the item to be gripped, or it may be adjusted manually.

The part of the jaw which is in direct contact with the item and therefor holds the item is herein referred to as the inner surface of the jaw. When the jaw members move to the closed position, this inner surface abuts the item and holds it fixed between the inner surfaces of the two jaw members. The closed position may be determined entirely on the size of the item being gripped meaning that the jaw members are forced by actuators to move towards the closed position until they are stopped by the item which is thereby pinched between the inner surfaces.

Each guard of the guard structure may be made in one piece or in several pieces assembled e.g. by bolts etc. The contact surface may be a planar surface or a curved surface. The contact surface may e.g. have an upright section extending in the upright direction and it may be followed by a lateral contact section extending laterally from the contact surface in a direction towards the contact surface of the other guard.

The upper surface of the foot portion may face the lateral contact section e.g. in a manner allowing the item to be pinched between the upper surface and the lateral contact section. For that purpose, the upper surface and the lateral contact section may move towards each other to reduce a gap therebetween when the jaw members move towards the closed jaw position. The gap between the lateral contact section and the upper surface of the foot portion, in the closed position of the jaw members, may particularly be less than 10 mm or even less than 1 mm to enable pinching a plate shaped element.

The guards may be arranged in spaced relation relative to one another, and the spacing between them may be adjustable to match varying sizes of the item being gripped. Particularly, the spacing between the guards may be stepwise adjustable to match different sizes of plate shaped elements to be picked up by the gripper.

Movement of the jaw members between the open and the closed jaw positions may be controlled by at least one actuator arranged between one of the first and second guards and the jaw members. Particularly, this arrangement of the at least one actuator may cause adjustment of the jaw position when adjusting the guard position to vary the spacing between the guards. Each guard may be joined to a corresponding one of the jaw members by an actuator, and if the guard is moved, the corresponding jaw member is moved via the actuator.

The jaw members may be joined to the base via a linear bearing allowing linear movement of the jaw members along the bearing structure. The linear bearing thereby defines a direction of movement of the jaw members between open and closed jaw positions.

Additionally, the gripper may include a rotational link being rotationally joined to the base, the rotational link synchronizing the movement of one jaw member with movement of the other jaw member. The rotational link may rotate around a link axis which is perpendicular to an axis defining a direction of movement of the jaw members between the closed and the open jaw positions.

Each guard may define a tapered surface extending from the free end to the contact surface. The distance between the tapered surfaces of the first and second guards is reduced in the direction from the free end towards the base. This may facilitate movement of the item towards the contact surface of the guards when the item is picked up by the jaw members.

When viewing the gripper in a projection onto a vertical plane, the forward edge of the jaw members may be in front of the free end of the guards in the direction from the base towards the free end. This allows the forward edge of the jaw members to reach a surface from which the item is picked up before the free end of the guards reaches the surfaces.

At least one of the jaw members is movable. However, both jaw members may be movable relative to the base to define the open jaw position and the closed jaw position. Movement of both jaw members may ensure a more precise gripping and release of the item.

The jaw members may be movable along said linear bearing structure and the first and second guards may be movable relative to the other guard along the same linear bearing structure to define the variable space between the contact surfaces. The bearing structure may e.g. comprise two parallel slide-bars on which the jaw members and the guards are slidable.

The linear bearing structure may define predefined fix locations for fixing the guards at the predefined locations. The fix locations may e.g. be defined by holes or cavities in the slide-bars in which locking pins on the guards can be fixed.

The gripper may comprise a scraper attached to each of the first and second jaw members. The scraper may define a leading edge in front of the forward edge whereby the leading edges of the two jaw members become located between the forward edges of the jaw members.

The scraper may be attached to the shaft portion at a scraper interface and the scraper may define a lateral scraper section extending partly along the upper surface of the foot portion.

The scraper may define an upright section extending in the upright direction from the interface to the lateral scraper section. The distance between interface and foot portion may e.g. be in the range of the length of the foot.

The scraper may be slidable against a surface of the foot portion such that the scraper can move relative to the foot portion e.g. to deflect upon contact with obstacles on the surface from which the item is picked up. The sliding of the scraper relative to the foot portion may occur by deflection of the upright section. In this case, the sliding may occur by partly rotation of the leading edge around the scraper interface. The scraper may be made from a plate shaped elastically deformable material and the deflection may cause elastic deformation of the scraper such that the scraper seeks back to the undeformed shape when possible, e.g. when the obstacle on the surface is passed.

The lateral scraper section may define an inward section extending in the inwards direction above the upper surface of the foot, and a downward section extending from the inward section to the leading edge. The leading edge is below the lower surface of the foot when viewed in a projection onto a vertical plane. The inward section and the downward section could be defined by bending the scraper whereby the two sections are joined in a bend portion of the lateral scraper section.

The forward edge may be arranged such that it contacts the scraper when the scraper is deflected and thereby moves the leading edge in the upright direction in response to the sliding of the downward section against the forward edge.

The scraper may be made from a blank of a sheet material, e.g. from a plate of steel.

The jaw member may define a grip-enhancing surface structure on the inner surface which faces the inner surface of the other jaw member in a mirrored layout. When the jaw members move to the closed position, this surface structure may be squeezed against the item which is lifted and thus increase the grip. The grip-enhancing surface structure may e.g. include elongated or pointwise projections on the inner surface arranged to increase surface pressure against the item and thus the gripping effect of the jaw member. In one embodiment, the grip-enhancing surface comprises at least one projection extending in the upright direction.

In a second aspect, a robot for moving an item is provided. The robot comprises a gripper according to the above description of the first aspect.

In a third aspect, a method of gripping an item is provided. The method defines gripping of the item, and particularly a plate shaped item such as a plate of cardboard. The item is gripped from a support surface by use of a robot comprising a gripper according to the above description.

The method comprises:
moving at least one of the jaw members relative to the other jaw member to the open jaw position,
moving the gripper to a position where the item is located between the forward edges,
moving the jaw members towards the closed jaw position until the item is arranged against the inner surfaces of the jaw members,
moving the gripper by use of the robot, and
moving the jaw members to the open jaw position while the item is released from the jaw members by contact between the item and at least one of the first and second guards.

The foot portion may be inserted between the support surface and the item and the jaw members may be moved towards the closed jaw position until the inner surface of the shaft portion is against the item.

The gripper, and the robot with the gripper may particularly be used for gripping cardboard plates. The cardboard plate defines an edge extending about a lower surface and an opposite upper surface, and the upper surface carries food items. Such food items could be poultry, fish, or meat and particularly slices of food items, e.g. slices of salmon. The cardboard plates could particularly be moved between a position vertically below the contact surfaces to a position between the contact surfaces by the movement of the jaw members from the open jaw position to the closed jaw position.

Due to the structure of the jaw members and the guards, the gripper may be in contact with the lower surface and the edge, but not with the upper surface and the food items. The jaw members and guards may particularly prevent sliding of the plates between the jaws by contact between edges of the plates and thereby prevent cross-contamination.

The robot and method according to the second and third aspects may include any feature implicit in view of the description of the gripper according to the first aspect.

BRIEF DESCRIPTION OF DRAWINGS

Embodiments will be described, by way of example only, with reference to the drawings, in which FIG. 6 illustrates one single jaw member, FIG. 7 illustrates one single guard.

DETAILED DESCRIPTION OF EMBODIMENTS

The detailed description and specific examples, while indicating embodiments of the disclosure, are given by way of illustration only, since various changes and modifications within the spirit and scope of the disclosure will become apparent to those skilled in the art from this detailed description.

Figure 1:
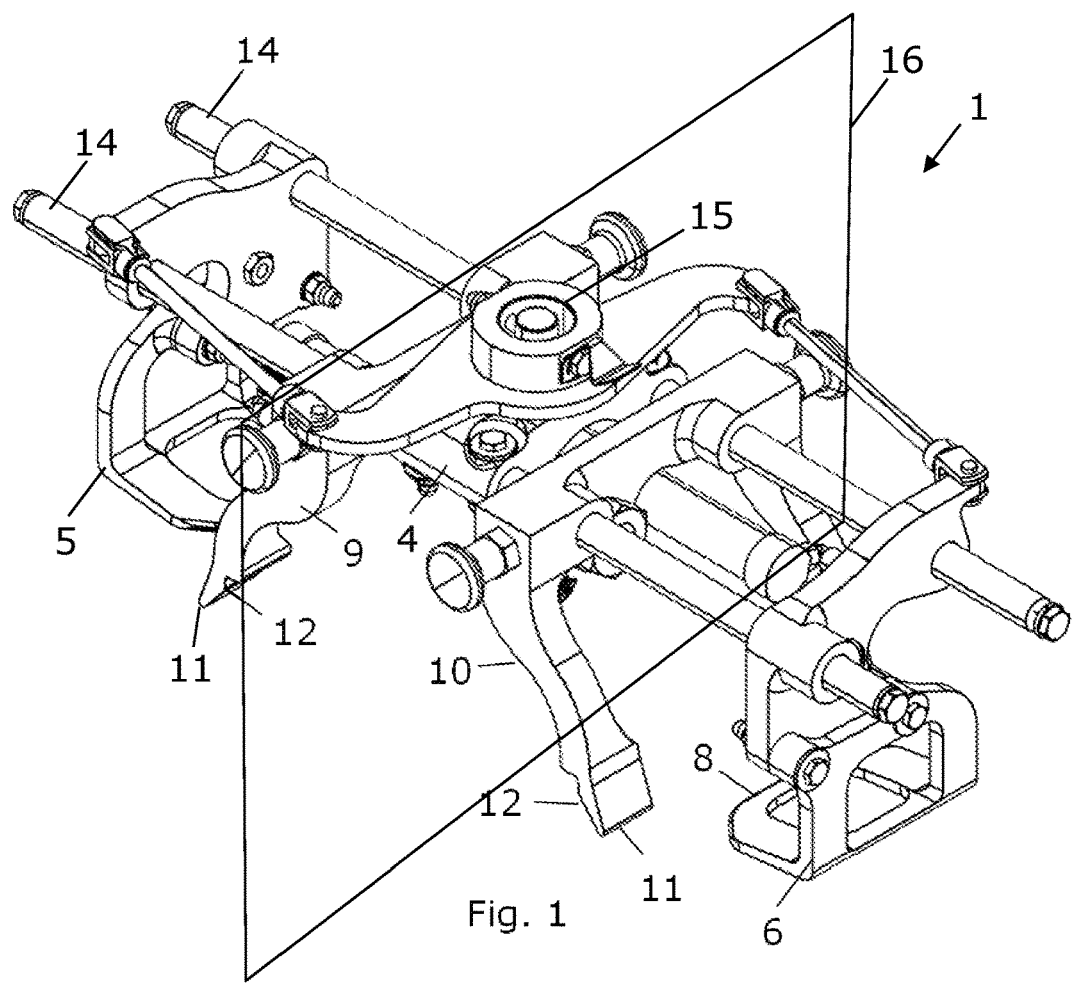
FIGS. 1 and 2a illustrate a gripper for picking up and re-positioning an item.
Figure 2A:
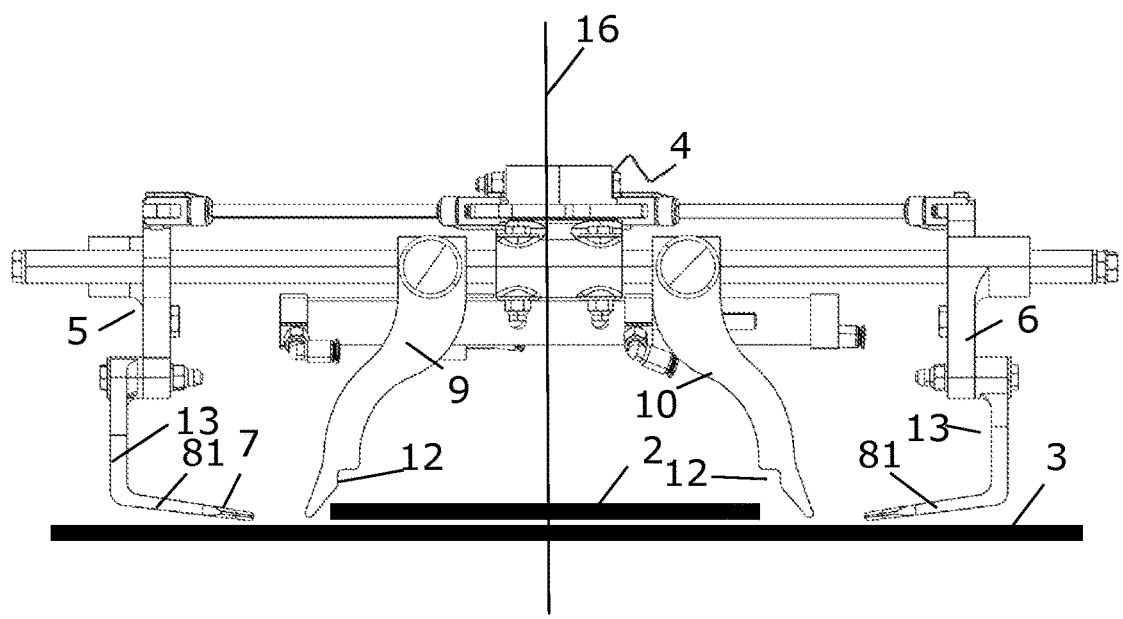

FIGS. 1 and 2a illustrate a gripper 1 for picking up and re-positioning an item 2 carried by a support surface 3. In FIG. 1, the gripper is illustrated in a perspective view and in FIG. 2 in a sideview. The support surface may particularly be a surface of a conveyor belt, and the gripper could be mounted on a robot for moving items to and/or from the conveyor belt such as from the conveyor belt to boxes or plates. The gripper may particularly be used for handling food items such as meat, e.g. pieces of fish such as pieces of salmon etc. arranged on a plate. The plate 2 is illustrated empty, but it could carry e.g. salmon slices.

To facilitate cleaning, the gripper could be made of non-corrosive materials which can be cleaned with water, e.g. anti-corrosive steel, or polymer materials such as POM, PA, PETG, PEHD, or Teflon etc., or other types of rigid plastic materials.

The gripper 1 comprises a base 4 forming an interface 15 for a robot (not shown) and holding various components, including e.g. air supply for actuators for opening and closing the gripper and a bearing structure for the jaw members and guards.

Figure 2B:
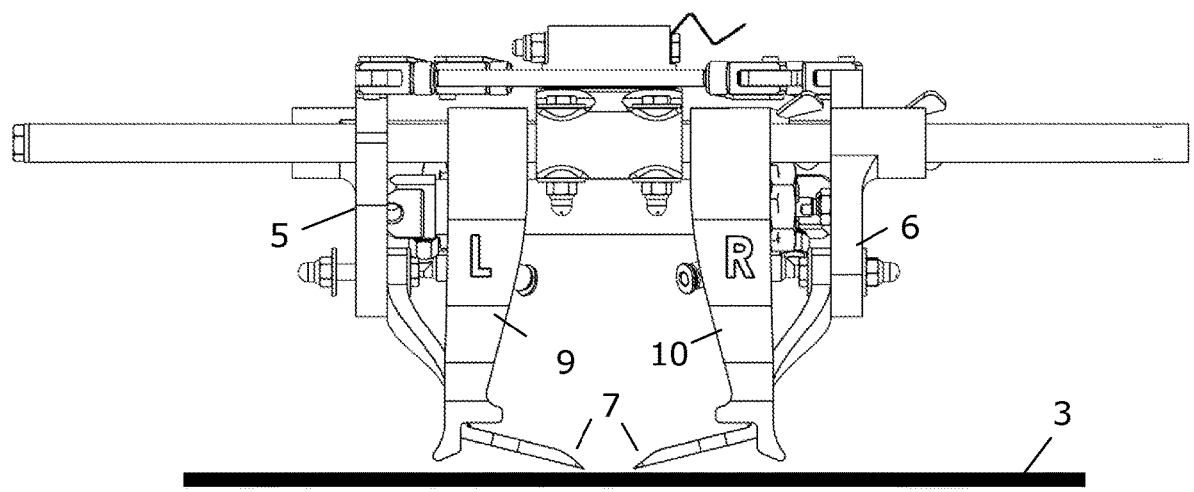
FIGS. 2b-2c illustrate an alternative shape of the foot portion of the jaw members.
Figure 2C:
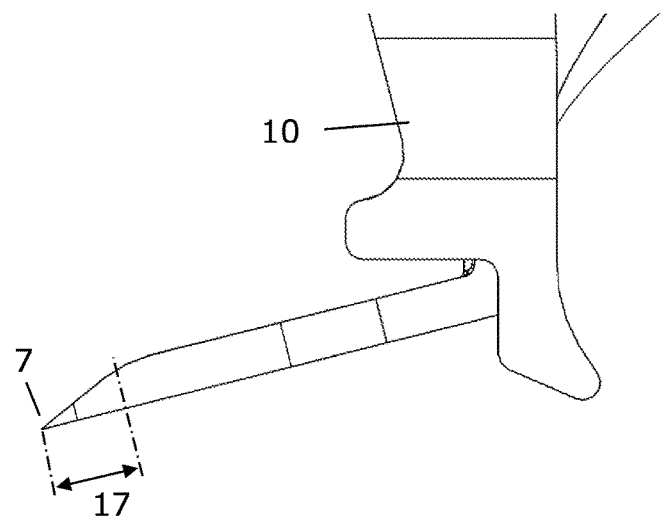

The jaw structure of the gripper comprises a first jaw member 5 and a second jaw member 6. Each jaw member defines a foot portion 81 illustrated in further details inter alia in FIGS. 2c, 5, 8, 9 and 10. The foot portion may generally define an upper surface which is inclined from the forward edge 7 toward the shaft of the jaw member. This inclined upper surface facilitates lifting of the item upon movement towards the closed jaw position. In FIGS. 2b and 2c, the foot portion has a particularly pointed shape with a section 17 being tapered to provide the inclination of the upper surface.

Figure 3:
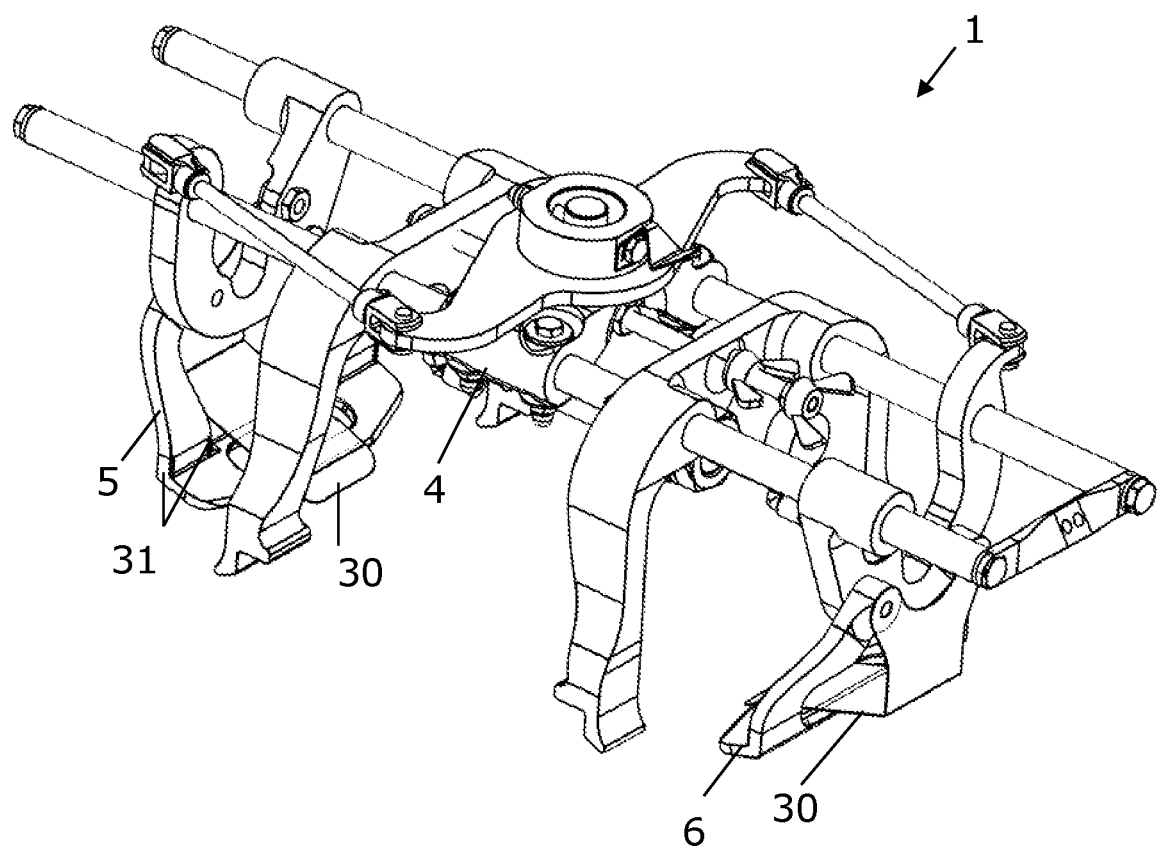
FIGS. 3 and 4 illustrate an alternative embodiment of the gripper with an optional scraper, FIG. 5 illustrate the embodiment of FIGS. 3 and 4 but in closed jaw position.

The jaw structure illustrated in FIG. 3 has vertical ribs 31 enabling a more firm grip of the item when the jaw members move to the closed jaw position.

Each jaw member defines a forward edge 7, 8 extending towards the forward edge of the other jaw member and the jaw members are movable relative to each other between an open jaw position and a closed jaw position. FIGS. 1-4 illustrate the gripper in an open jaw position, and FIG. 5 illustrates the gripper in the closed jaw position wherein the forward edges 7, 8 are closer to each other.

For defining what is herein referred to as an upright direction, FIGS. 1 and 2 illustrates a vertical centre-plane 16. This centre-plane is virtual, i.e. only drawn for defining an upright direction. The vertical centre-plane extends from the robot interface 15 through a point centrally between the forward edges of the jaw members.

A direction is herein referred to as "upright direction" if it has a component when projected onto this plane, i.e. an upright direction is not necessarily a vertical direction but a direction which can be projected onto the vertical centre-plane and defines a component therein.

The embodiment of the gripper illustrated in FIGS. 1-5 comprises a guard structure with a first guard 9 and a second guard 10. The guards extend in an upright direction between a free end 11 and the base. At the base, the guards are attached in a manner allowing variable distance between the guards.

Each guard forms a contact surface 12. One of the guards is illustrated individually in FIG. 7. The contact surface 12 is configured for contact with the item, and particularly for contact with a thin, plate shaped element which is lifted by the jaw members to a position where it is between the guards.

An inner surface 13 of the jaw member is located on one side of the contact surface in the closed jaw position and on an opposite side of the contact surface in the open position. This is illustrated by the difference between the open jaw position in FIGS. 1-4 and the closed jaw position in FIG. 5.

The jaw members are movable in a linear movement along a linear bearing structure, in the specific embodiments of FIGS. 1-5 constituted by the two linear bearings 14.

The jaw members are illustrated separately in FIG. 6. Each jaw member defines a shaft portion 80 and a foot portion 81. The shaft portion extends in an upright direction between the base 4 and the foot portion 81.

The foot portion extends laterally from the shaft portion, i.e. in an inwards direction towards the foot portion of the other jaw member. The foot portion defines an upper surface 82 facing towards the base and an opposite lower surface 83 facing downwards and away from the base. In use, the lower surface faces a support surface from which the item is being gripped.

FIG. 7 illustrates details of the guards. Each guard defines a contact surface 12 which extends in an upright direction. The contact surface is followed by a lateral contact section 91 extending laterally from the contact surface. The lateral contact section may extend perpendicular to the contact surface.

The upper surface 82 of the foot portion may face towards lateral contact section 91. In one embodiment, the dimension may be such that a plate which is to be gripped, can be pinched between the upper surface 82 and the lateral contact section 91.

Figure 4:
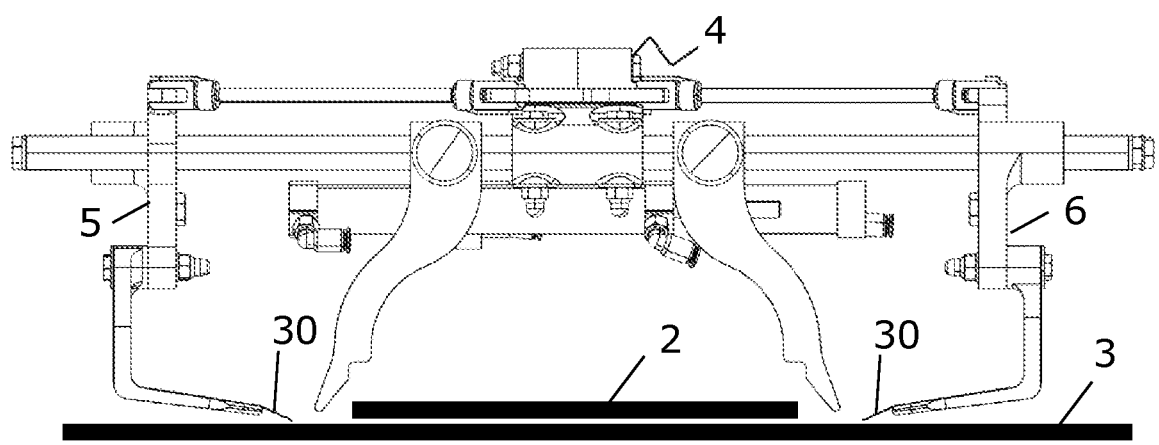

The embodiments illustrated in FIGS. 3-5 are provided with an optional scraper 30 attached to each of the first and second jaw members. The scraper is attached to the shaft portion by bolts 103 forming a scraper interface.

Figure 10:
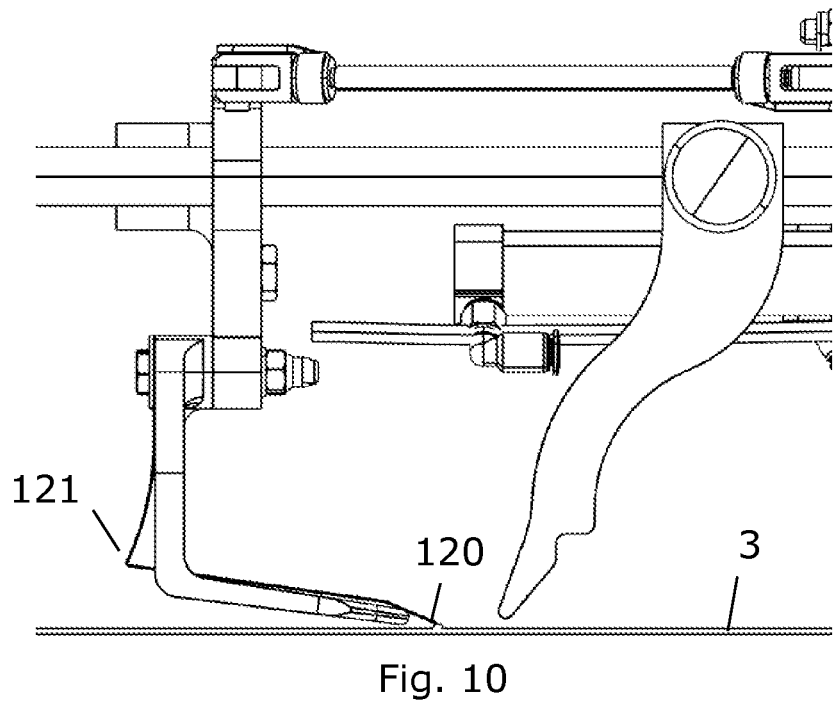
FIG. 10 illustrates lifting of a leading edge of a scraper by sliding against a forward edge of the foot portion of the jaw member.

A lateral scraper section 100 (illustrated with a dashed parenthesis in FIG. 9) of the scraper extends partly along the upper surface of the foot portion and defines a leading edge 101 ahead of the forward edge 7 meaning that the forward edge is located between the shaft portion 80 and the leading edge 101 in the inwards direction. One jaw member with a scraper is illustrated in FIG. 10

The scraper defines an upright section 102 extending in the upright direction from the interface, i.e. the bolts 103 to the lateral scraper section 100. The distance between the interface and the foot is like the length of the foot.

In use, the scraper is slidable against a surface of the foot. During this movement, the scraper deflects in the upright section such that the transition between the upright section and the lateral scraper section bends laterally backwards. The scraper is made from a plate of a sheet material, particularly, it could be a sheet of steel material and the deflection could be during elastic deformation of the scraper.

Figures 8, 9:
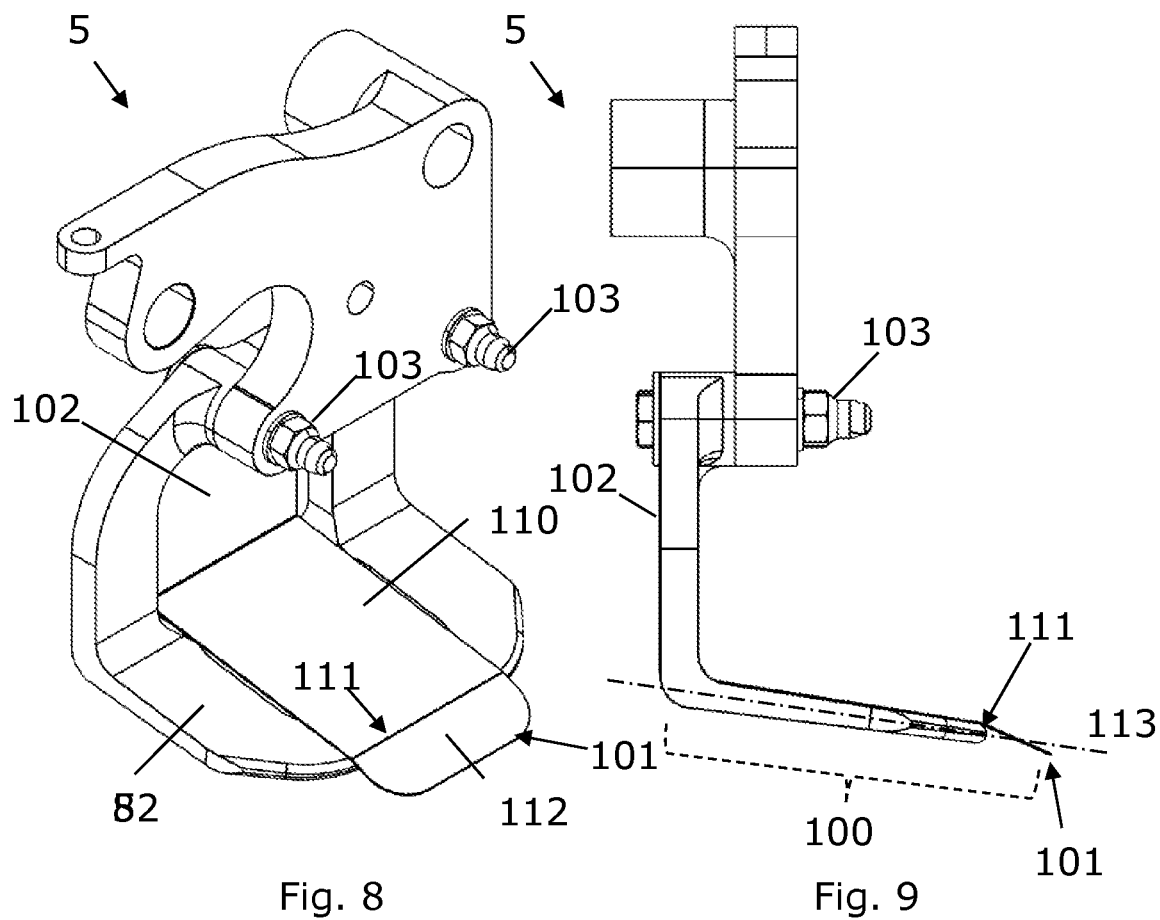
FIGS. 8, 9 illustrate one single jaw member of the embodiment in FIGS. 3-4.

As best seen in FIGS. 8 and 9, the lateral scraper section 100 defines an inward section 110 extending in the inwards direction above the upper surface 82 of the foot. The lateral scraper section comprises a transition in the form of a bend 111 separating the inward section 110 from a downward section 112. The downward section extends from the inward section to the leading edge and extends across a plane defined by the foot and illustrated by the dotted line 113. The leading edge and the inward section are thereby on opposite sides of the plane, and the leading edge is below the lower surface of the foot when seen in a projection onto a vertical plane.

The forward edge is arranged to move the leading edge in the upright direction in response to the sliding of the downward section against the forward edge. This is illustrated in FIG. 10. The leading edge 101 of the scraper hits the bump 120 on the support surface 3 and the scraper deflects backwards. This is particularly made possible by the upright section deflecting backwards as illustrated by the displaced corner point 121. In FIG. 10 it is clearly seen that when the scraper deflects in this way, the leading edge must be lifted when the downward section slides against the forward edge of the foot portion of the jaw member.

Figure 11:
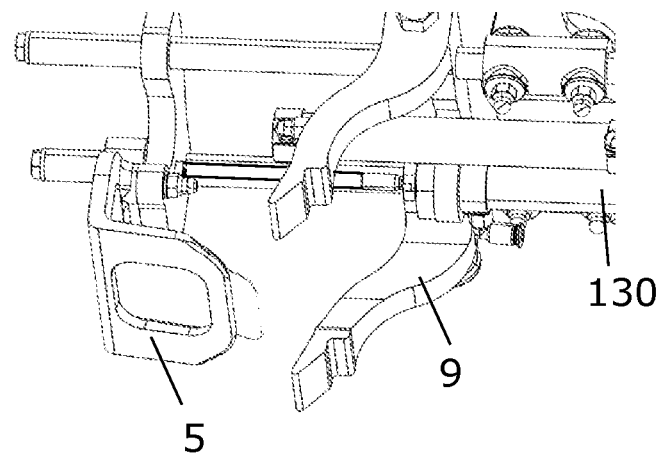
FIG. 11 illustrates details of a connection between a guard and a jaw member.

FIG. 11 illustrates details of an actuator 130 connected between the guard 9 and the jaw member 5. The actuator is movable to move the jaw member between the open and closed jaw positions.

Figure 12:
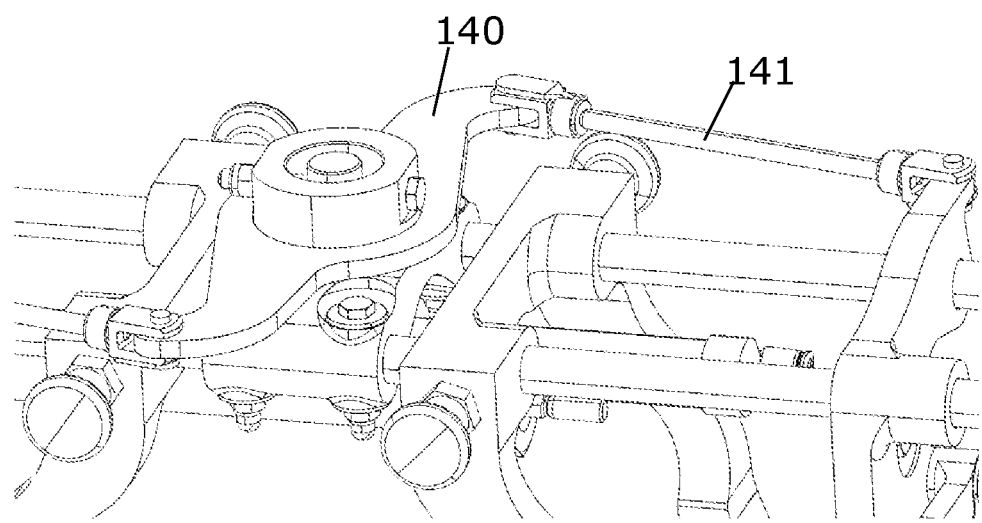
FIG. 12 illustrates details of adjusting the position of the guards and the jaw members.

FIG. 12 illustrates further details of the gripper including a rotational link 140 attached rotationally to the base and connected to each jaw member by connecting rods 141 to thereby synchronize the movement of one jaw member with movement of the other jaw member.

Figure 13:
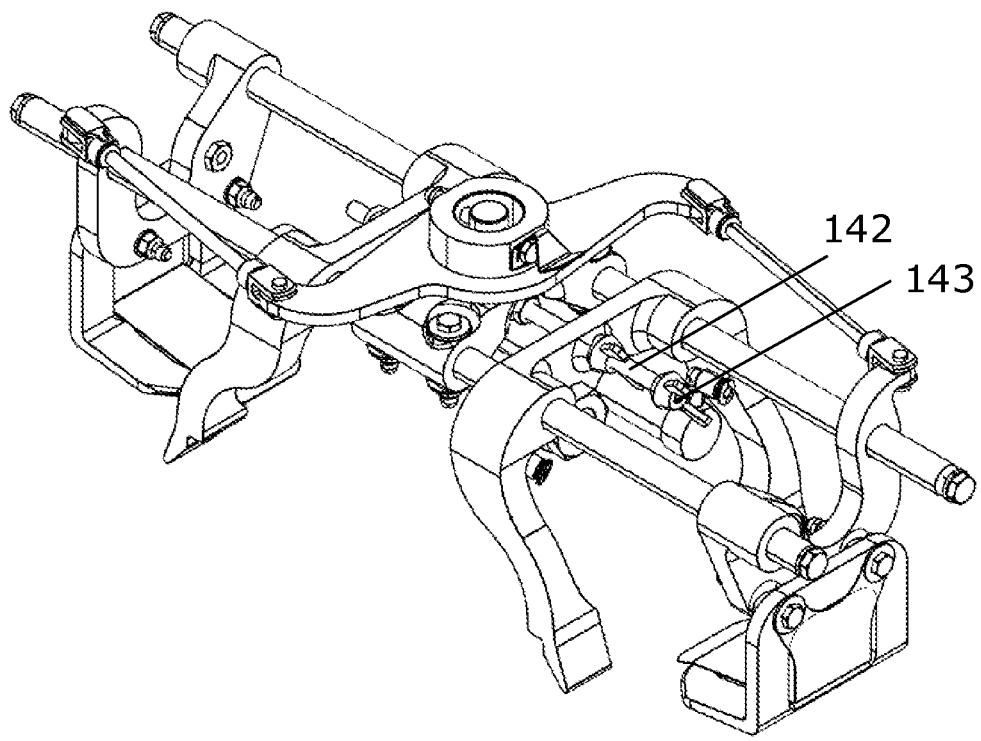
FIGS. 13 and 14 illustrates an embodiment of the gripper with stepless adjustment of the position of the guard.
Figure 14:
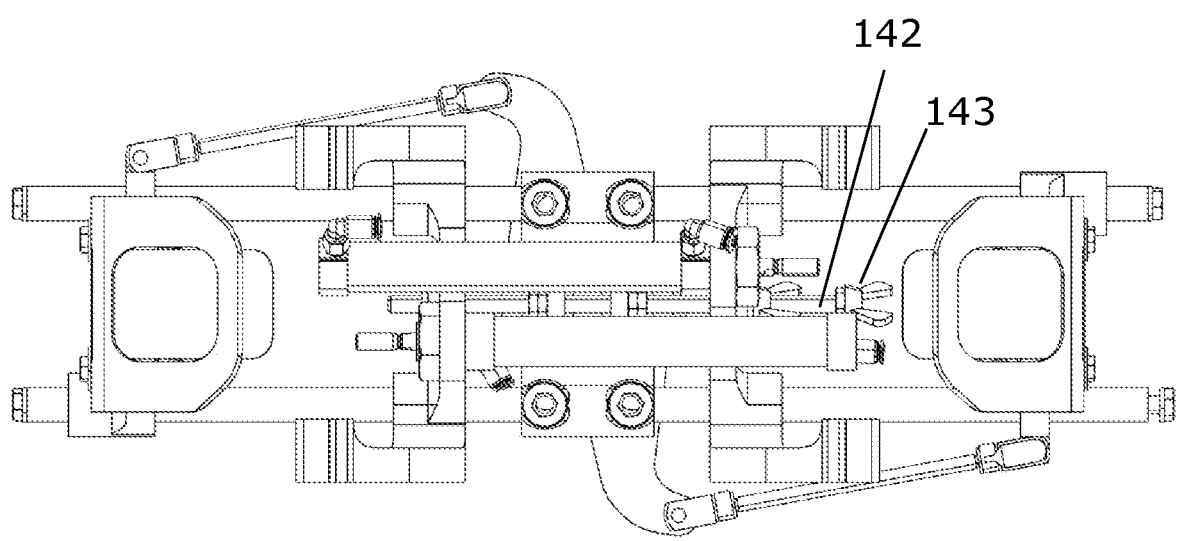

FIG. 13 illustrates a gripper with an adjustment screw 142 having a first section engaging an adjustment nut on one of the guards and a second section engaging an adjustment nut on the other guard. The threads of the first section are opposite the threads of the second section, i.e. one is links and one is rechts. Rotation of the adjustment screw 142 thereby brings the grippers either towards or away from each other. The screw could be manually operated by use of the handle 143, or an electrical motor may control the distance, e.g. a step motor. FIG. 14 illustrates the gripper from below.

Figure 15:
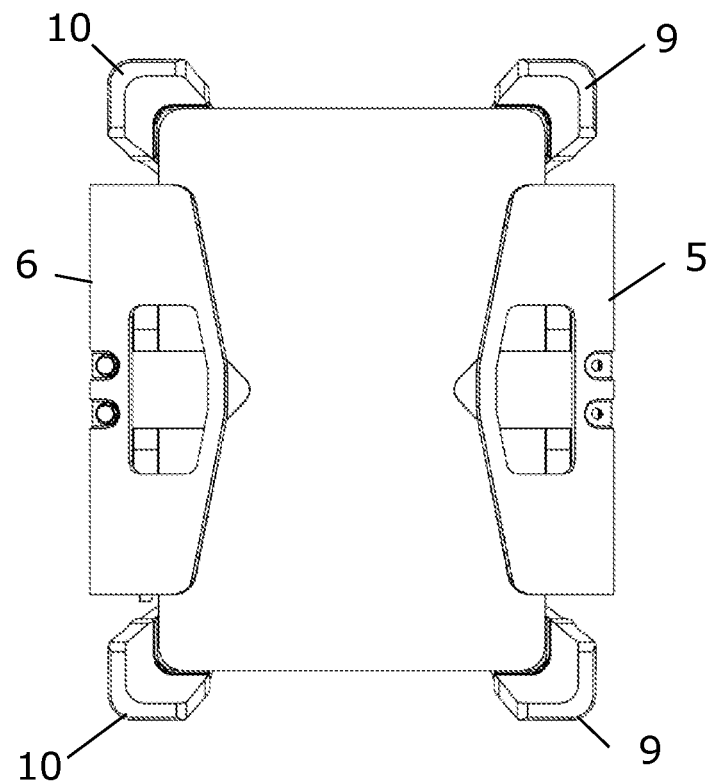
FIGS. 15 and 16 illustrate a gripper with corner fitting elements forming the guards.
Figure 16:
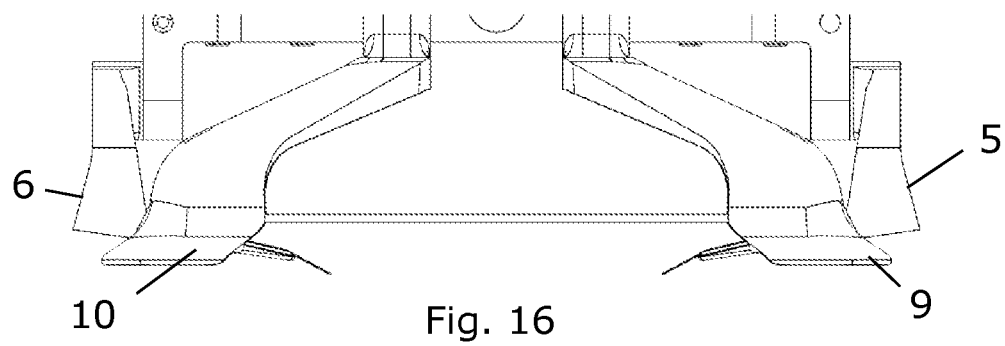

The guard structure may define contact surfaces which are arranged for contact with two sets of diametrically opposite sides of a plate shaped element which is being picked up. This may be useful e.g. when handling cardboard plates for food. FIGS. 15 and 16 illustrate a gripper where the first guard 9 and the second guard 10 are made as corner fitting elements arranged at opposite corners of the plate shaped element which is being picked up. The jaw members may not necessarily pinch the plate shaped element but may just lift the element upwards from the surface where it is carried until it is located between the corner fitting elements.

Figure 17:
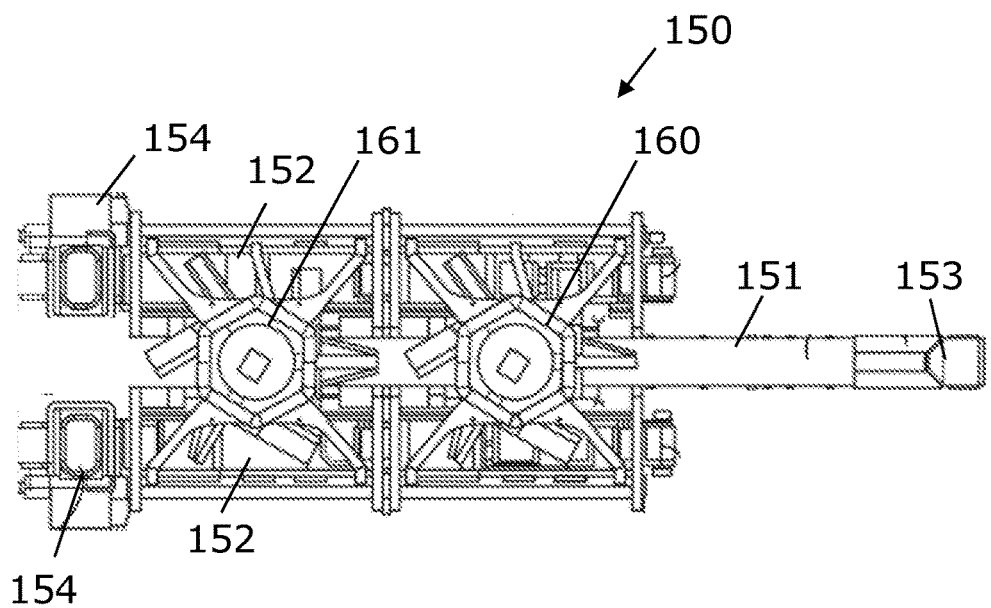
FIG. 17 illustrates a production line with a robot with a gripper.

FIG. 17 illustrates a process line 150 in a food processing facility. The food processing line comprises a conveyor belt comprising an inlet section 151 and two outlet sections 152. The conveyors form support surfaces and carry the items from the inlet 153 to the outlets 154 of the process line. A robot station including two robots 160, 161 each having a gripper, is arranged between the inlet and the outlet and handles the food items, and more particularly moves the food items from the inlet section 151 to one of the outlet sections 152. The outlet sections 152, 154 could include a thermo former for making thermo-formed receiving pockets for receiving cardboard plates carrying food items.

Figure 18:
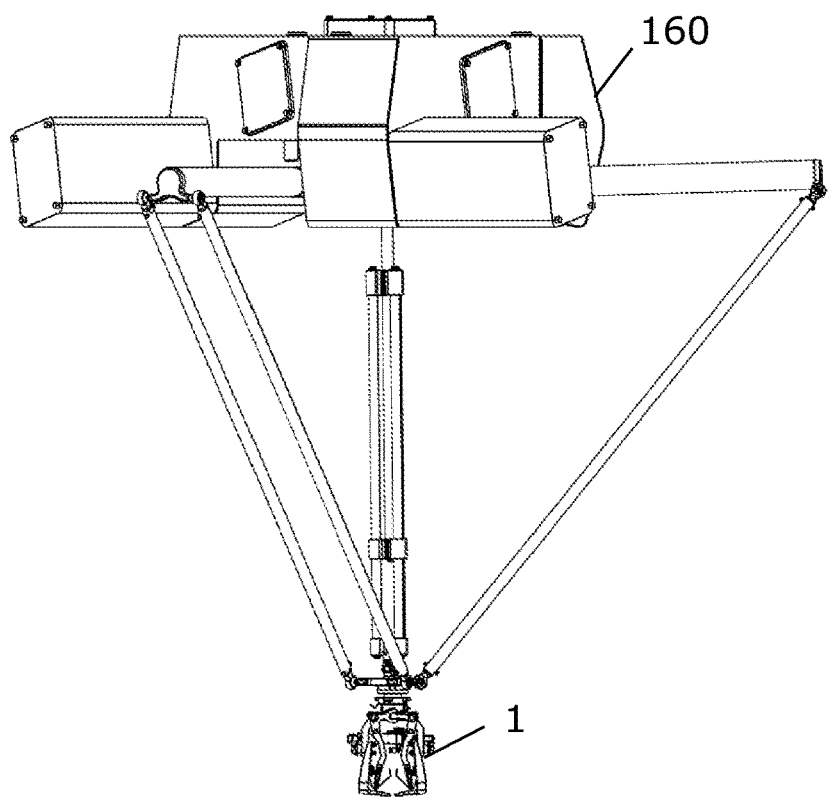
FIG. 18 illustrates a robot with a gripper.

The robot 160 is a tripod or delta kinematic robot and it is fitted with a gripper 1 of the above explained kind. The Robot with the gripper is illustrated in FIG. 18.

Figure 19:
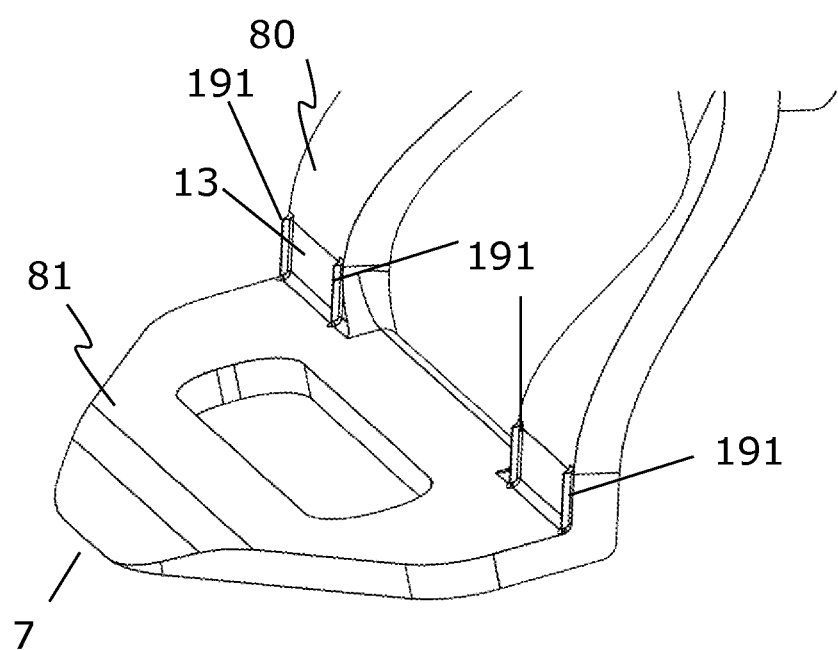
FIG. 19 illustrates a jaw member with grip increasing projections.

FIG. 19 illustrates a jaw member with a shaft portion 80 and a foot portion 81. In this embodiment, the shaft portion defines an inner surface 13 which faces the inner surface of the other jaw member in a mirrored layout.

The inner surface 13 comprises projections 191 providing an increased surface pressure against the item and thus increases the gripping effect of the jaw member. The projections are illustrated as four vertical lines, but other projecting surface structures could be envisaged, e.g. dots etc.

The invention claimed is:

1. A gripper for gripping an item, the gripper comprising:
a base,
a first jaw member and a second jaw member, at least one jaw member being movable towards the other jaw member to define a closed jaw position and away from the other jaw member to define an open jaw position, and a guard structure comprising a first guard and a second guard extending in an upright direction between a free end and the base and each forming a contact surface facing a contact surface of the other guard, wherein the jaw members are arranged, in response to movement to the closed jaw position, to lift the item in the upright direction to a position located between the contact surfaces of the guards, and wherein the jaw members are movable along a linear bearing structure and wherein each jaw member defines an inner surface facing an inner surface of the other jaw member and wherein the inner surfaces, by movement of the jaw members from the open jaw position to the closed jaw position, move from a distal position where a distance between the inner surfaces exceeds a distance between the contact surfaces, to a proximal position where the distance between the contact surfaces exceeds the distance between the inner surfaces;

wherein each of the first guard structure and the second guard structure defines a tapered surface extending from a free end to the contact surface, wherein a distance between tapered surfaces of the first guard structure and the second guard structure is reduced in a direction from each free end towards the base.

2. The gripper according to claim 1, wherein each jaw member defines a shaft portion and a foot portion, the shaft portion extending in an upright direction between the base and the foot portion, and the foot portion extending laterally from the shaft portion towards the foot portion of the other jaw member, the foot portion having an upper surface towards the base and an opposite lower surface facing away from the base, the upper and lower surfaces terminating in a forward edge extending towards the forward edge of the other jaw member, and wherein the upper surface is inclined in the upright direction from the forward edge toward the shaft to effect the lifting of the item upon movement towards the closed jaw position.

3. The gripper according to claim 2, wherein each guard forms a lateral contact section extending laterally from the contact surface in a direction towards the contact surface of the other guard.

4. The gripper according to claim 3, wherein the upper surface faces the lateral contact section.

5. The gripper according to claim 1, wherein at least one of the first and second guards is movable relative to the other guard to define a variable space between the contact surfaces.

6. The gripper according to claim 5, wherein at least one of the first and second guards is movable relative to the other guard along the linear bearing structure to define the variable space between the contact surfaces.

7. The gripper according to claim 1, comprising at least one actuator arranged between one of the first and second guards and the jaw members, the actuator arranged to move the jaw members between the open and closed jaw positions.

8. The gripper according to claim 7, wherein movement of the guards relative to each other moves the jaw members relative to each other via the actuator connecting the jaw member and the guard.

9. The gripper according to claim 1, wherein both jaw members are joined to the base via a rotational link being rotationally joined to the base, the rotational link synchronizing the movement of one jaw member with movement of the other jaw member.

10. The gripper according to claim 1, wherein the guard structure forms contact surfaces arranged for contact with two sets of diametrically opposite sides of a plate shaped element which is being picked up.

11. The gripper according to claim 10, wherein the first guard and the second guard form corner fitting elements arranged at opposite corners of the plate shaped element which is being picked up.

12. The gripper according to claim 2, wherein the inner surface of at least one of the jaw members comprises a grip-enhancing surface texture.

13. The gripper according to claim 12, wherein the surface texture comprises at least one projection on the inner surface.

14. The gripper according to claim 2, wherein the foot portion comprises a tapered section provide the inclination of the upper surface.

15. A robot for moving an item, the robot comprising a gripper according to claim 1.

16. A method of gripping an item from a support surface by use of a robot comprising a gripper according to claim 2, the method comprising:

moving at least one of the jaw members relative to the other jaw member to the open jaw position, moving the gripper to a position where the item is located between the forward edges, moving the jaw members towards the closed jaw position until the item is arranged against the inner surfaces of the jaw members, moving the gripper by use of the robot, and moving the jaw members to the open jaw position while the item is released from the jaw members by contact between the item and at least one of the first and second guards.

17. The method according to claim 16, wherein foot portion is inserted between the support surface and the item.

18. The method according to claim 17, wherein the jaw members are moved towards the closed jaw position until the inner surface of the shaft portion is positioned against the item.

19. The method according to claim 16, wherein the item comprises a cardboard plate with an edge extending about a lower surface and an opposite upper surface, the upper surface carrying food items.

20. The method according to claim 19, wherein the gripper is in contact with the lower surface and the edge, and not in contact with the upper surface and the food items.

* * * * *